(12) United States Patent
Fujita et al.

(10) Patent No.: US 12,467,935 B2
(45) Date of Patent: Nov. 11, 2025

(54) AUTOMATIC ANALYZER (71) Applicant: Hitachi High-Tech Corporation, Tokyo (JP)

(72) Inventors: Hiroki Fujita, Tokyo (JP); Teruhiro Yamano, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 671 days.

(21) Appl. No.: 17/907,879

(22) PCT Filed: Feb. 8, 2021

(86) PCT No.: PCT/JP2021/004494
§ 371 (c)(1),
(2) Date: Aug. 29, 2022

(87) PCT Pub. No.: WO2021/181971
PCT Pub. Date: Sep. 16, 2021

(65) Prior Publication Data
US 2023/0135106 A1    May 4, 2023

(30) Foreign Application Priority Data
Mar. 13, 2020  (JP) ................ 2020-044117

(51) Int. Cl.
*G01N 35/02* (2006.01)
*G01N 35/00* (2006.01)
*G01N 35/10* (2006.01)

(52) U.S. Cl.
CPC ....... *G01N 35/025* (2013.01); *G01N 35/0092* (2013.01); *G01N 35/1002* (2013.01);
(Continued)

(58) Field of Classification Search
CPC ............ G01N 35/1016; G01N 35/025; G01N 35/1002; G01N 35/00663; G01N 35/0092; G01N 2035/00891; G01N 2035/00673
See application file for complete search history.

(56) References Cited

U.S. PATENT DOCUMENTS 6,090,630 A    7/2000 Koakutsu et al.
11,828,765 B2 *  11/2023 Kaneda ............ G01N 35/00712
(Continued)

FOREIGN PATENT DOCUMENTS

JP    2011-203114 A    10/2011

OTHER PUBLICATIONS

Extended European Search Report issued in European Application No. 21768918.1 dated Jan. 30, 2024 (8 pages).
(Continued)

*Primary Examiner* — Shogo Sasaki
(74) *Attorney, Agent, or Firm* — Crowell & Moring LLP (57) ABSTRACT

Provided is an automatic analysis device capable of replenishing consumables without loss of a specimen and without stopping analysis. The state of an automatic analysis device 100 includes a replenishment prohibition state in which replenishment of consumables (reaction vessel 8, specimen dispensing tip 10*a* and external reagent vessels 21*a*, 21*b*, 21*c*) is prohibited, and a replenishment permission state in which replenishment of consumables is permitted. In the replenishment prohibition state, a specimen dispensing mechanism 10 performs dispensing, and detection units 18*a* and 18*b* perform analysis. In the replenishment permission state, the specimen dispensing mechanism 10 does not perform dispensing, and the detection units 18*a* and 18*b* perform analysis. A device state control unit 119*d* causes the automatic analysis device 100 to transition to the replenish-
(Continued)

ment permission state when the remaining amount or the remaining number of the consumables predicted by a consumables remaining amount prediction unit 119b becomes equal to or less than a predetermined value.

7 Claims, 7 Drawing Sheets

(52) U.S. Cl.
CPC .................. *G01N 35/1016* (2013.01); *G01N 2035/00891* (2013.01)

(56) References Cited

U.S. PATENT DOCUMENTS

| 2011/0236981 | A1 | 9/2011 | Wakamiya et al. |
| 2012/0269682 | A1 | 10/2012 | Watanabe et al. |
| 2014/0161667 | A1* | 6/2014 | Kokic .................... G16H 10/40 705/28 |
| 2021/0318345 | A1* | 10/2021 | Kaneda ............ G01N 35/00712 |

OTHER PUBLICATIONS

International Search Report (PCT/ISA/210) issued in PCT Application No. PCT/JP2021/004494 dated Apr. 6, 2021 with English translation (five (5) pages).

Japanese-language Written Opinion (PCT/ISA/237) issued in PCT Application No. PCT/JP2021/004494 dated Apr. 6, 2021 (three (3) pages).

\* cited by examiner

ANALYSIS PLAN INFORMATION X

ANALYSIS PLAN INFORMATION Y

ANALYSIS PLAN INFORMATION Z

[FIG. 7]

AUTOMATIC ANALYZER

TECHNICAL FIELD

The present disclosure relates to an automatic analyzer.

BACKGROUND ART

The automatic analyzer adds a reagent, which specifically reacts with a specific ingredient contained in a biogenic sample (hereinafter, referred to as specimen) such as blood or urine, to the biogenic sample to react the reagent with the ingredient, and measures the absorbance or amount of luminescence of a reaction solution for qualitative and/or quantitative analysis.

The automatic analyzer typically has a storage cabinet to extra store not only analytical reagents corresponding to test items but also external reagents and detergents to enable large number of analyses. In a typical laboratory, a device manager beforehand checks reagents and detergents previously loaded in a device, and collectively loads the reagents and the detergents in only a quantity necessary for daily analysis. If there is a shortage of the reagents or the detergents during analysis, the analysis must be suspended to replenish the reagents or the detergents. In such a case, minimum reagents or detergents must be able to be quickly poured.

A large automatic analyzer consumes a large amount of consumables a day due to its high processing capacity and thus often has a configuration where a plurality of vessels, each accommodating the same type of reagent or detergent, are connected together. In such a case, a user cannot replace a vessel, which currently supplies the reagent or the detergent, among the vessels, but can replace a vessel that currently supplies no reagent or detergent. As a result, it is possible to promptly replace the reagent or the detergent without stopping analysis, which prevents a reduction in throughput of analysis.

On the other hand, a small automatic analyzer holds only the minimum necessary consumables to be used therein in light of space saving. Similarly, for the reagents or the detergents, a plurality of vessels, each accommodating the same type of reagent or detergent, are desirably not connected together to achieve the minimum necessary amount. For the analyzer having such a configuration, the minimum necessary consumables must be replenished without stopping analysis for possible shortage of the consumables.

A known existing technique includes an automatic analyzer, in which the same type of reagent vessel as a reagent vessel loaded in the analyzer can be replaced without stopping analysis (for example, see PTL 1).

CITATION LIST

Patent Literature

PTL 1: Japanese Unexamined Patent Application Publication No. 2011-203114.

SUMMARY OF INVENTION

Technical Problem

In the existing technique, however, when the remaining amount or the remaining number of consumables (such as system reagents, reaction vessels, and specimen dispensing tips) held in the consumables holding unit is lost, although analysis is continued in a continuable test even if the consumables are insufficient, the consumables cannot be replaced unless analysis is stopped. When a user resumes analysis after replacing consumables, therefore, extremely long time is problematically taken.

Furthermore, in such a case, a previously dispensed specimen becomes wasted for a test in which analysis cannot be continued, and thus loss of the specimen problematically occurs.

An object of the disclosure is to provide an automatic analyzer, in which the remaining amount or the remaining number of consumables is predicted, and a state is provided such that when the remaining amount or the remaining number is determined to be equal to or less than a predetermined value, the consumables can be replenished while dispensing of a specimen is stopped, thereby the consumables can be replenished without losing the specimen and stopping analysis.

Solution to Problem

An automatic analyzer according to one embodiment of the present disclosure includes
a specimen dispensing unit for dispensing a specimen,
an analysis unit for analyzing components included in the specimen,
a consumables holding unit for holding a consumable used for the analysis of the specimen,
a consumables remaining amount prediction unit for predicting the remaining amount or the remaining number of consumables held in the consumables holding unit, and
a device state control unit for controlling the state of the automatic analyzer,
where the state of the automatic analyzer includes a replenishment prohibition state in which replenishment of the consumables is prohibited, and a replenishment permission state in which replenishment of the consumables is permitted,
in the replenishment prohibition state, the specimen dispensing unit performs dispensing, and the analysis unit performs analysis,
in the replenishment permission state, the specimen dispensing unit does not perform dispensing, and the analysis unit performs analysis, and
when the remaining amount or the remaining number of consumables predicted by the consumables remaining amount prediction unit is equal to or less than a predetermined value, the device state control unit causes the automatic analyzer to transition to the replenishment permission state.

The description covers the disclosure of Japanese patent application JP-2020-044117 as the basis for the right of priority of this application.

Advantageous Effects of Invention

According to the disclosure, there is provided a state where even if the number of the consumables is equal to or less than a predetermined number, specimen dispensing is stopped without suspending analysis, and a user can replenish the consumables. As a result, it is possible to promptly resume dispensing after the user replenishes the consumables, and eliminate waste of the specimen.

DESCRIPTION OF EMBODIMENTS

First Embodiment

A configuration and operation of an automatic analyzer 100 being one embodiment of the disclosure are now described with FIGS. 1 to 7. The automatic analyzer 100 performs various types of analyses, including, for example, biochemistry and immunity. Corresponding parts may be designated by corresponding reference numerals or signs.

Figure 1:
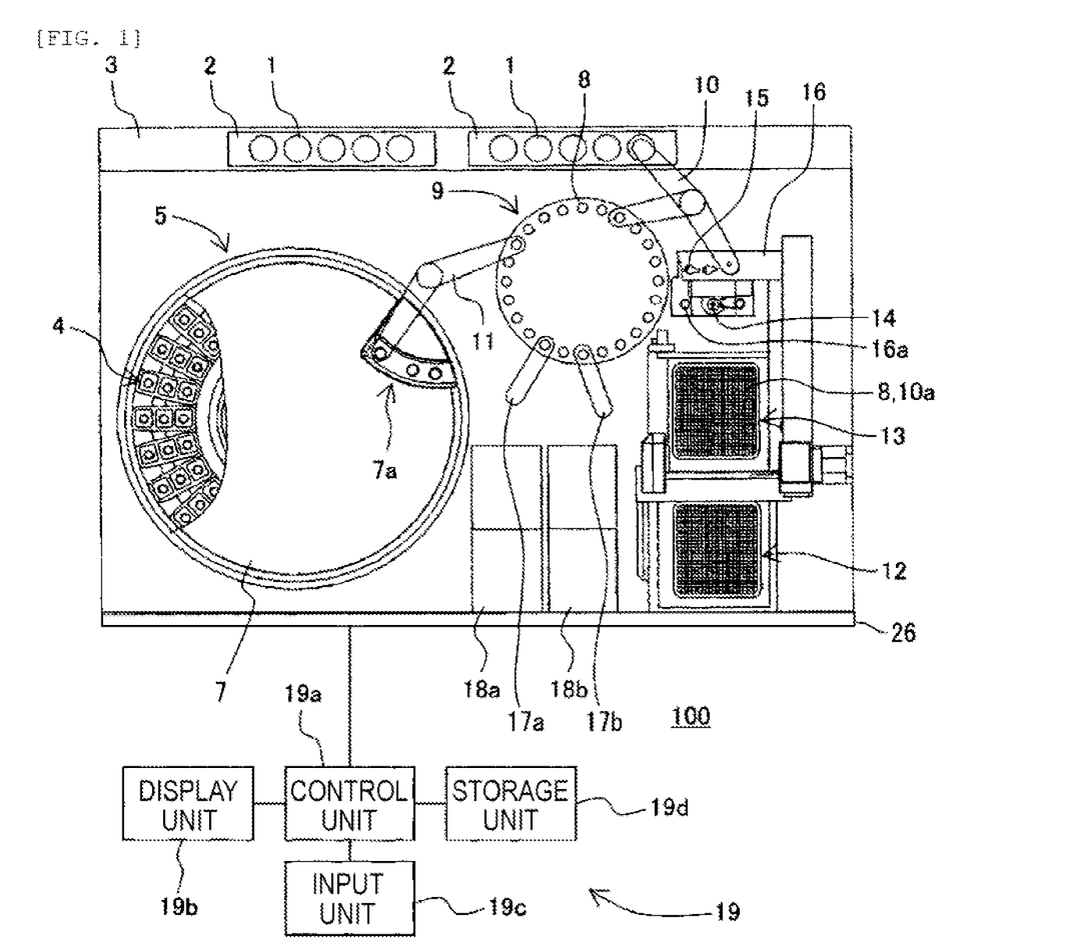
FIG. 1 is a configuration diagram of an automatic analysis device.
Figure 2:
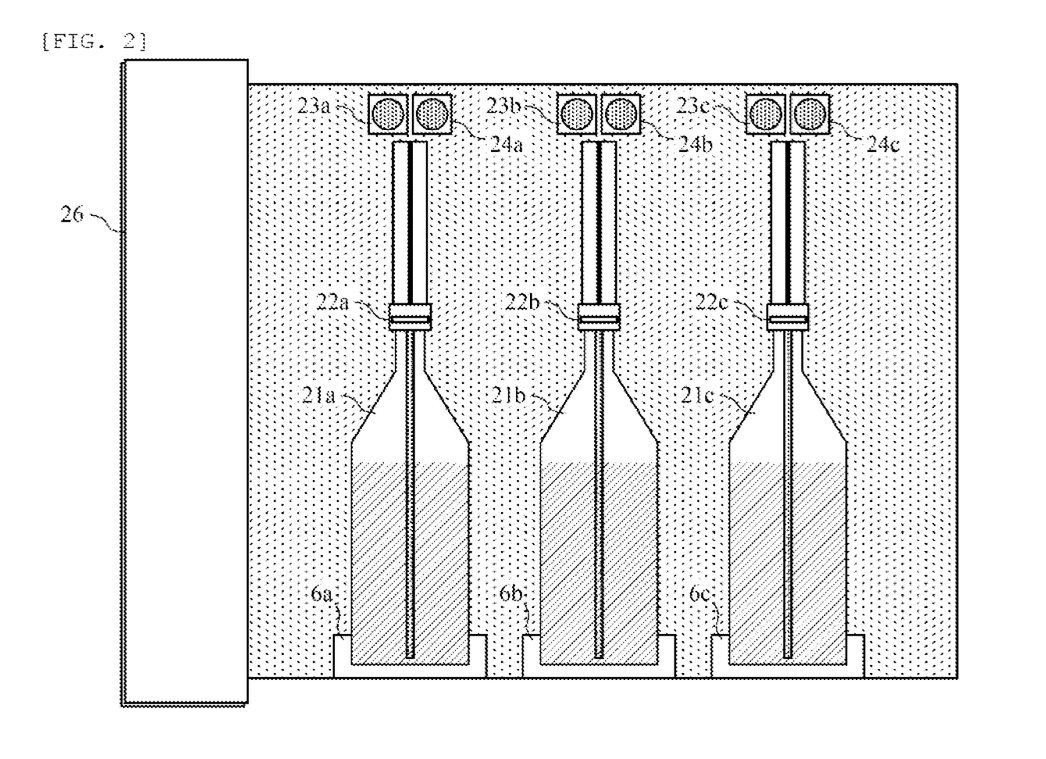
FIG. 2 is a diagram for illustrating a configuration of a peripheral portion of an external reagent vessel used in the automatic analysis device.

First, an overall configuration of the automatic analyzer 100 is described with FIGS. 1 and 2. FIG. 1 is a configuration diagram of the automatic analyzer 100 as viewed from an upper direction.

The automatic analyzer 100 includes a specimen vessel rack 2, a rack transport line 3 that transports the specimen vessel rack 2, a reagent cool box 5, an incubator (reaction disc) 9, a specimen dispensing mechanism 10, a reagent dispensing mechanism 11, a reaction vessel and specimen dispensing tip storage unit 12 for replenishment, a reaction vessel and specimen dispensing tip supply unit 13, a reaction vessel agitation mechanism 14, a disposal hole 15, a transport mechanism 16, nozzles 17a and 17b, detection units 18a and 18b, a control device 19, and a front surface cover 26.

FIG. 2 is a diagram of the automatic analyzer 100 as viewed from a front direction (from the lower side on the paper in FIG. 1) when the front surface cover 26 of the automatic analyzer 100 is opened. The front surface cover 26 is, for example, configured to be opened or closed while turning to the front with the left end portion as an axis.

The automatic analyzer 100 includes external reagent vessels 21a, 21b, and 21c (reagent vessels) that accommodate respective different reagents. The automatic analyzer 100 further includes external reagent holders 6a, 6b, and 6c, tube lifters 22a, 22b, and 22c, first switches with indicators 23a, 23b, and 23c, and second switches with indicators 24a, 24b, and 24c in correspondence to the external reagent vessels 21a, 21b, and 21c, respectively.

A configuration that can achieve the disclosure of this application is not limited to the automatic analyzer 100. For example, another configuration can be used as an automatic analyzer configured such that one external reagent vessel can be provided for one reagent type. A liquid accommodated in each of the external reagent vessels 21a, 21b, and 21c may be a liquid other than the reagent (for example, another liquid loadable in the analyzer, such as a detergent or a diluent).

The specimen vessel rack 2 accommodates a plurality of specimen vessels 1. The specimen vessels 1 each accommodate a specimen. The rack transport line 3 transports the specimen vessel rack 2.

The reagent cool box 5 is covered with a reagent cool box cover 7. The reagent cool box 5 accommodates a plurality of reagent vessels 4 warmed at a constant temperature. The reagent vessel 4 accommodates various reagents to be used for analysis of a specimen.

The reagent cool box 5 may further have a reagent vessel opening mechanism (not shown) for opening the reagent vessel 4. This allows a lid of the reagent vessel 4 to be opened or closed within the reagent cool box 5, enabling deterioration of the reagent to be suppressed. The reagent cool box 5 is not limited to the disc type, and may be a serial type in which the reagent vessels 4 are arranged in one or more line.

The incubator 9 has a plurality of vessel holding holes arranged on the circumference. Each vessel holding hole can accommodate a reaction vessel 8 (vessel). The reaction vessel 8 is to mix a specimen and a reagent. The incubator 9 is intermittently rotated to position the reaction vessel 8 to a predetermined position in correspondence to progress of analysis. A process necessary for each of steps, such as dispensing of a specimen or a reagent, agitation, and analysis, is performed while the incubator 9 is stopped.

The specimen dispensing mechanism 10 serves as a specimen dispensing unit, and dispenses a specimen into the reaction vessel B. The specimen dispensing mechanism 10 includes an arm unit to be rotationally or vertically driven, and a nozzle unit that aspirates and discharges a specimen. A specimen dispensing tip 10a can be detachably attached to an end of the nozzle unit. The rack transport line 3 transports the specimen vessel 1 to a specimen dispensing position, and the nozzle unit moves down with respect to the specimen vessel 1 and aspirates a predetermined amount of a specimen. The arm unit in turn rotates, and the nozzle unit discharges the specimen into the reaction vessel 8 disposed at a predetermined position in the incubator 9.

The reagent dispensing mechanism 11 includes a nozzle unit that aspirates and discharges a reagent. The reagent cool box cover 7 has a reagent cool box cover opening unit 7a, and the reagent dispensing mechanism 11 discharges, via the reagent cool box cover opening unit 7a, a predetermined amount of reagent aspirated from the reagent vessel 4 into a reaction vessel 8 disposed at a predetermined position on the incubator 9 through horizontal drive, vertical drive, aspiration operation, and discharge operation.

The reaction vessel agitation mechanism 14 agitates a reaction liquid accommodated in the reaction vessel 8 extracted from the incubator 9.

The reaction vessel and specimen dispensing tip supply unit 13 can accommodate a plurality of unused reaction vessels 8 and a plurality of unused specimen dispensing tips 10a. The reaction vessel and specimen dispensing tip storage unit 12 is kept on standby for replenishment of the reaction vessels 8 and the specimen dispensing tips 10a.

The specimen dispensing tip 10a is mounted on a nozzle end of the specimen dispensing mechanism 10 so that a specimen in a specimen vessel is aspirated, and then the used specimen dispensing tip 10a is discarded from the disposal hole 15. When analysis is ended, the used reaction vessel 8 is also discarded from the disposal hole 15. The discarded, used specimen dispensing tip 10a and reaction vessel 8 are accommodated in a disposal box (not shown), and the remaining capacity of the disposal box (disposable number) is managed by the automatic analyzer 100.

The transport mechanism 16 includes a gripper unit to grip the specimen dispensing tip 10a and the reaction vessel 8 accommodated in the reaction vessel and specimen dispensing tip supply unit 13, and a drive unit to transport the gripper unit along the XYZ axes. In detail, the transport mechanism 16 is provided to be movable in the X axis, Y axis, and Z axis directions (not shown). The transport mechanism 16 can transport the reaction vessel 8 accommodated in the reaction vessel and specimen dispensing tip supply unit 13 to the incubator 9, can discard the used reaction vessel 8 into the disposal hole 15, and can transport an unused specimen dispensing tip 10a to a tip mounting position 16a.

The nozzles 17a and 17b aspirate reaction liquids mixed in the reaction vessels 8 on the incubator 9 and pass the reaction liquids to the detection units 18a and 18b, respectively, through rotational drive and vertical drive. The respective detection units 18a and 18b perform a detection process on the reaction liquids aspirated and passed by the nozzles 17a and 17b to detect specific components, and thus analyze components contained in the specimens. In other words, the detection units 18a and 18b each serve as an analysis unit.

The control device 19 controls overall operation of the automatic analyzer 100. The control device 19 includes a control unit 19a, a display unit 19b, an input unit 19c, and a storage unit 19d. Detailed operation of the control device 19 is described later with FIG. 5.

In this configuration, the tube lifters 22a, 22b, and 22c as shown in FIG. 2 can each be manually moved up and down. For example, with the tube lifter 22a, the external reagent vessel 21a is placed on the external reagent holder 6a while the tube lifter 22a is pulled to the upper side, and then a tube is inserted into the external reagent vessel 21a from a mouth portion of the external reagent vessel 21a. A reagent syringe (not shown) is pulled or pushed in such a state, thereby a reagent is supplied from the external reagent vessel 21a to a flow path. The above description equally applies to each of the tube lifters 22b and 22c.

A user can push each of the first switches with indicators 23a, 23b, and 23c before starting reagent replacement. The indicator of each of the first switches with indicators 23a, 23b, and 23c is, for example, a lamp (such as LED) that can express respective states of yellow lighting, yellow blinking, and light-out. A condition of the reagent replacement process is expressed by the indicator of each of the first switches with indicators 23a, 23b, and 23c. An expression form of the condition of the reagent replacement process can be appropriately designed by those skilled in the art. In addition, a correspondence relationship between each condition and the indicator state is also appropriately designed by those skilled in the art.

The user can push each of the second switches with indicators when completing the reagent replacement. The indicator of each of the second switches with indicators 24a, 24b, and 24c is, for example, a lamp (such as LED) that can express respective states of green lighting, green blinking, and light-out. A condition of the reagent vessel is expressed by the indicator of each of the second switches with indicators 24a, 24b, and 24c. An expression form of the condition of the reagent vessel can be appropriately designed by those skilled in the art. In addition, a correspondence relationship between each condition and the indicator state is also appropriately designed by those skilled in the art.

Although this embodiment uses a hardware having a configuration where the indicators are combined with the switches, this is merely one example, and a hardware configuration where the indicators are separated from the switches may also be used.

In this embodiment, the first switches with indicators 23a, 23b, and 23c are each used as a trigger of reagent replacement start, and the second switches with indicators 24a, 24b, and 24c are each used as a trigger of reagent replacement completion. Specifically, the switches with indicators 23a, 23b, 23c, 24a, 24b, and 24c each serve as an instruction receiving unit to receive an instruction from a user. The switches can be configured as part of the input unit 19c and/or the display unit 19b in FIG. 1.

The instruction receiving unit may have any configuration that receives a trigger of reagent replacement start and/or a trigger of reagent replacement completion without being limited to the above configuration. For example, the trigger of reagent replacement start may be implemented by a sensor that can detect each of the tube lifters 22a, 22b, and 22c to be pulled up, and the trigger of reagent replacement start may be implemented by a sensor that can detect each of the tube lifters 22a, 22b, and 22c to be pushed down.

The automatic analyzer 100 has a reader (not shown). When the external reagent vessels 21a, 21b, and 21c are placed in the external reagent holders 6a, 6b, and 6c, respectively, the reader reads an individual identification sign (while not shown, an RF-ID tag in this embodiment) marked on the back of each of the external reagent vessels 21a, 21b, and 21c, and transmits the identification information to the control unit 19a of the control device 19.

A barcode label may be used as another example of the individual identification sign of each of the external reagent vessels 21a, 21b, and 21c. Examples of the identification information recorded on the individual identification sign include a reagent identification number (identification code) for identifying a reagent accommodated in each of the external reagent vessels 21a, 21b, and 21c, a test item name corresponding to the accommodated reagent, a lot number, and a sequence number.

In this embodiment, the consumables used in analysis of a specimen include the specimen dispensing tip 10a, the reaction vessel 8, the disposal box, the external reagent vessels 21a, 21b, and 21c, and a liquid (such as a reagent) accommodated in each external reagent vessel. In this embodiment, a consumables holding unit holding the consumables includes the reaction vessel and specimen dispensing tip supply unit 13, the disposal box, and the external reagent holders 6a, 6b, and 6c.

The consumables holding unit may further include a buffer region. In this embodiment, the reaction vessel and specimen dispensing tip storage unit 12 serves as the buffer region. The buffer region means a region beforehand filled with the consumables.

In a configuration where the buffer region (for example, the reaction vessel and specimen dispensing tip storage unit 12) is provided for a consumables holding unit (for example, the reaction vessel and specimen dispensing tip supply unit 13), when replacement of a consumable is started for that consumables holding unit during analysis operation, the automatic analyzer 100 changes a supply source of consumables from the consumables holding unit to the buffer region according to an instruction of an operator.

As a result, the previous buffer region (reaction vessel and specimen dispensing tip storage unit 12) temporally serves as the consumables holding unit, and the previous consumables holding unit (the reaction vessel and specimen dispensing tip supply unit 13) supplies no consumable. Consumables in the previous consumables holding unit can be replaced in this state.

The buffer region may be provided for another consumables holding unit. For example, the buffer region can be provided for each of the external reagent vessels 21$a$, 21$b$, and 21$c$.

Figure 3:
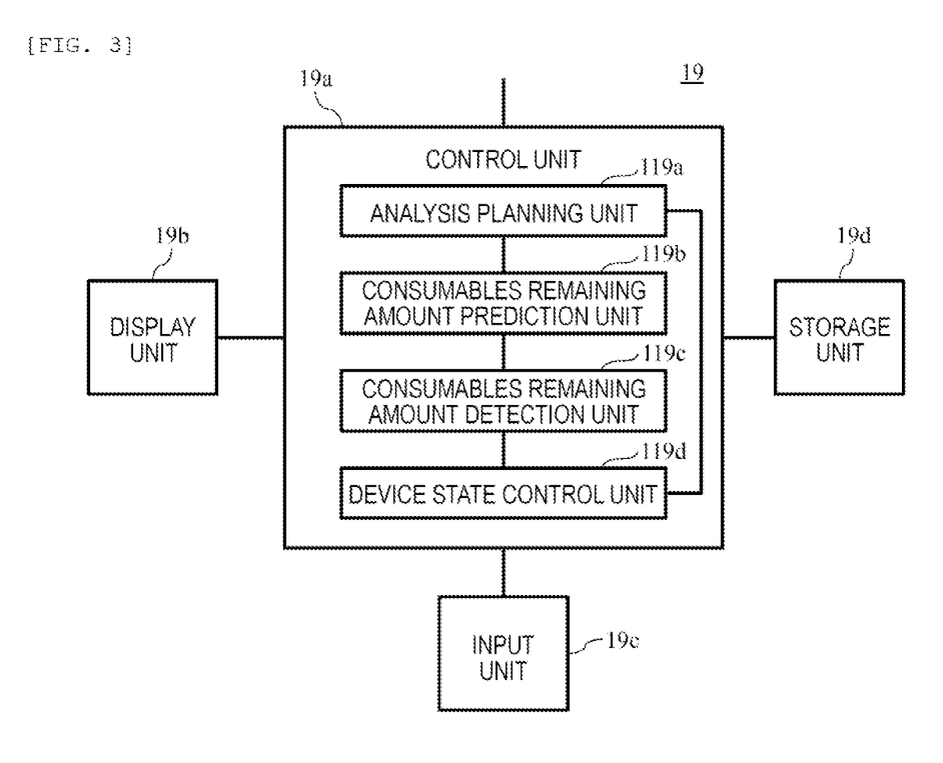
FIG. 3 is a diagram for illustrating the functions of a control device used in the automatic analysis device.

FIG. 3 is a function block diagram of the control device 19 used in the automatic analyzer 100. Functions of the control device 19 used in the automatic analyzer 100 are described with FIG. 3. The control device 19 controls overall operation of the automatic analyzer 100.

The control device 19 operates based on a beforehand set program and a user instruction received with the input unit 19$c$, for example. The control device 19 controls, for example, specimen analysis, consumable replacement, device maintenance, detection of the remaining amount or the remaining number of consumables, and a prediction process of the remaining amount or the remaining number of consumables. The control device 19 further controls an analysis scheduling process. The analysis scheduling process means, for example, a process of beforehand confirming each analysis step to be performable, and managing when the step is performed.

The control device 19 includes the control unit 19$a$, the display unit 19$b$, the input unit 19$c$, and the storage unit 19$d$.

The control unit 19$a$ performs operation control of the automatic analyzer 100, processing of an analysis result, and information management.

The display unit 19$b$ displays an analysis-related setting input screen, an analysis result screen, a content screen in abnormality detection, and a message screen to prompt replacement of a reagent or a consumable.

The input unit 19$c$ serves as an instruction receiving unit to receive an instruction from a user. The input unit 19$c$ receives input of information on a specimen, information on an analysis item, an instruction to suspend analysis, an instruction to resume analysis, or the like, and transmits such information to the control unit 19$a$ as necessary.

The storage unit 19$d$ stores setting information on analysis, information on a specimen, information on a reagent, information on an analysis result, information indicating the remaining amount or the remaining number of consumables, information on prediction of the remaining amount or the remaining number of consumables, a program defining operation of the automatic analyzer 100, and the like.

The control unit 19$a$ includes an analysis planning unit 119$a$, a consumables remaining amount prediction unit 119$b$, a consumables remaining amount detection unit 119$c$, and a device state control unit 119$d$.

The analysis planning unit 119$a$ is a function block that controls an analysis plan including a series of operations, i.e., beforehand checking whether a test to be started from now can be scheduled during analysis, and if the test can be scheduled, registering such a confirmation result into an analysis step scheduler of the device.

Specifically, the analysis planning unit 119$a$ beforehand checks whether interference may occur between operations of the individual mechanisms, whether there may be a shortage in the remaining amount or the remaining number of consumables, or the like.

The analysis planning unit 119$a$ performs a process in defined cycles (for example, one cycle is defined as 30 sec).

The analysis planning unit 119$a$ acquires analysis plan information from the storage unit 19$d$, and based on the analysis plan information, schedules steps of a target test (steps necessary for one test arranged on the time axis are collectively referred to as test sequence) in a current cycle. The analysis planning unit 119$a$, based on the scheduling result, checks whether interference occurs between operations of the individual mechanisms, whether there is a shortage in the remaining amount or the remaining number of consumables, or the like.

At this time, the analysis planning unit 119$a$ acquires information on the remaining amount or the remaining number of consumables (for example, information indicating whether consumables will be insufficient) from the consumables remaining amount prediction unit 119$b$. When determining that there is no problem in any check item, the analysis planning unit 119$a$ registers a target test sequence in a record of a target cycle of the analysis plan information, and notifies the consumables remaining amount prediction unit 119$b$ that the target test sequence can be scheduled.

When the consumables remaining amount prediction unit 119$b$ notifies the analysis planning unit 119$a$ of information indicating that the remaining amount or the remaining number of consumables will be insufficient, the analysis planning unit 119$a$ notifies the device state control unit 119$d$ that the target test cannot be scheduled because the remaining amount or the remaining number of consumables will be equal to or less than a specified value, and does not register the target test sequence in the analysis plan information. When determining that there is a problem in another check item, the analysis planning unit 119$a$ also notifies the device state control unit 119$d$ that the target test cannot be scheduled, and does not register the target test sequence in the analysis plan information.

Which cycle each step of the target test sequence is performed in is determined by the scheduling. When analysis operation is performed in every cycle, an analysis step performed in the relevant cycle is specified based on the analysis plan information, and actually performed.

The consumables remaining amount prediction unit 119$b$ is a functional block that predicts the remaining amount or the remaining number of consumables held in the consumables holding unit. The consumables remaining amount prediction unit 119$b$ receives an instruction and test sequence information from the analysis planning unit 119$a$. The test sequence information relates to a test sequence to be scheduled in a specified cycle, and includes information indicating the specified cycle and information of each step.

The consumables remaining amount prediction unit 119$b$ acquires a current predicted value of the remaining amount or the remaining number from the storage unit 19$d$. The consumables remaining amount prediction unit 119$b$ acquires the remaining amount or the remaining number to be updated after scheduling the target test sequence, based on the current predicted value of the remaining amount or the remaining number.

In this way, the consumables remaining amount prediction unit 119$b$ calculates the predicted value of the remaining amount or the remaining number of each consumable (a specific process of the predicted value of the remaining amount or the remaining number of a consumable is described later with reference to FIG. 6). Such "predicted value of the remaining amount or the remaining number" calculated herein means, for example, the amount or the number of a consumable that is not registered in the analysis plan information among the amounts or the numbers of currently unused consumables.

The consumables remaining amount prediction unit 119$b$ determines whether the calculated predicted value of the remaining amount or the remaining number of each consumable is equal to or less than a specified value, and notifies the analysis planning unit 119a of the determination result.

When the analysis planning unit 119a finally determines that the target test sequence can be scheduled in a specified cycle, the consumables remaining amount prediction unit 119b, based on an instruction from the analysis planning unit 119a, notifies the storage unit 19d of the predicted value of the remaining amount or the remaining number of each consumable (an updated predicted value when the target test sequence is scheduled) to store the predicted value.

The consumables remaining amount detection unit 119c may notify the consumables remaining amount prediction unit 119b that the remaining amount or the remaining number of each consumable is updated by hardware. When receiving such notification, the consumables remaining amount prediction unit 119b reflects the updated result on the predicted value of the remaining amount or the remaining number of each consumable, and stores the reflected result in the storage unit 19d.

The consumables remaining amount detection unit 119c is a functional block that manages the remaining amount or the remaining number of each consumable. The consumables remaining amount detection unit 119c also reflects a detection result of a change in the remaining amount or the remaining number due to hardware such as a sensor on the information of the remaining amount or the remaining number. The information on the remaining amount or the remaining number of consumables managed by the consumables remaining amount detection unit 119c is displayed on a screen via the display unit 19b. When detecting a change in the remaining amount or the remaining number of a consumable due to hardware such as a sensor, the consumables remaining amount detection unit 119c also notifies the consumables remaining amount prediction unit 119b of such a detection result.

The device state control unit 119d is a function block that controls a state of the automatic analyzer 100 based on operation of the control unit 19a. The state of the automatic analyzer 100 includes an analysis execution state and an analysis stop state. The detection units 18a and 18b each perform analysis operation in the analysis execution state, but do not perform analysis operation in the analysis stop state. The specimen dispensing mechanism 10 does not perform dispensing operation in the analysis stop state.

Further, the analysis execution state includes a replenishment prohibition state in which replenishment of the consumables is prohibited, and a replenishment permission state in which replenishment of the consumables is permitted. Specific operation of "replenishment" can be optionally designed, and may include, for example, operation of additionally supplying an unused consumable and operation of replacing a used consumable with an unused consumable.

In the replenishment permission state, the specimen dispensing mechanism 10 does not perform dispensing. This prevents a situation where dispensing cannot be normally performed because the specimen dispensing mechanism 10 operates during replenishment operation by a user. The replenishment permission state is a type of the analysis execution state as described above, and thus the detection units 18a and 18b perform analysis in that state.

In the replenishment prohibition state, the specimen dispensing mechanism 10 performs dispensing according to operation of the automatic analyzer 100. In this state, replenishment operation by a user is prohibited. This prevents a situation where replenishment operation by a user is performed during operation of the specimen dispensing mechanism 10 and thus the operation of the specimen dispensing mechanism 10 is interfered. The replenishment prohibition state is also a type of the analysis execution state as described above, and thus the detection units 18a and 18b perform analysis in that state.

Figure 4:
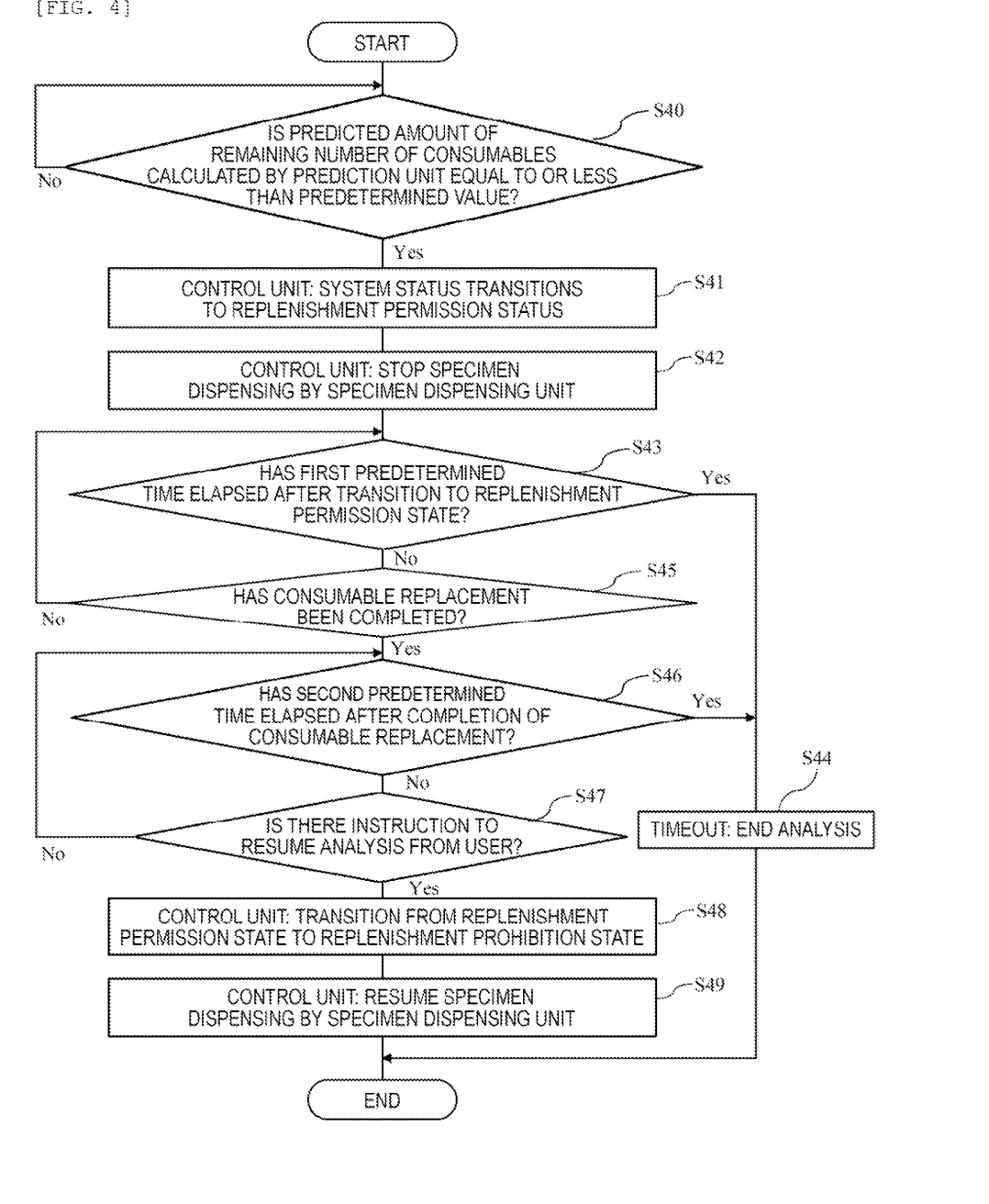
FIG. 4 is a flowchart showing a process when the remaining amount or the remaining number of consumables used in the automatic analysis device is predicted to be equal to or less than a specified value.

FIG. 4 is a flowchart showing a process when the remaining amount or the remaining number of consumables is predicted to be equal to or less than the specified value in this embodiment. The automatic analyzer 100 is assumed to be in execution of analysis operation in the replenishment prohibition state.

The analysis planning unit 119a performs determination on a specified value for the remaining amount or the remaining number of consumables via the consumables remaining amount prediction unit 119b, and determines whether scheduling of a target test can be performed. In other words, the analysis planning unit 119a determines whether the predicted value is equal to or less than a specified value (step S40). When determining the predicted value is equal to or less than the specified value, the analysis planning unit 119a notifies the device state control unit 119d of that effect.

In response to this, the device state control unit 119d controls the automatic analyzer 100 to suspend further specimen dispensing. Specifically, when the remaining amount or the remaining number of consumables predicted by the consumables remaining amount prediction unit 119b is equal to or less than a predetermined value, the device state control unit 119d causes the automatic analyzer 100 to transition to the replenishment permission state (step S41), and thus dispensing by the specimen dispensing mechanism 10 is stopped (step S42).

Subsequently, the automatic analyzer 100 continues analysis operation in the replenishment permission state. Specifically, the device state control unit 119d controls such that each consumable can be replenished while a test, in which specimen dispensing has been completed, is continued.

At this time point, the automatic analyzer 100 may output information indicating shortage of the remaining amount or the remaining number of consumables and/or information indicating a type of an insufficient consumable. Such output is performed by the display unit 19b (including the switches with indicators 23a, 23b, 23c, 24a, 24b, and 24c), for example. A user can recognize the information and replenish the insufficient consumable.

After replenishing the consumable, the user inputs an instruction indicating end of replenishment (replenishment end instruction) and an instruction indicating resumption of dispensing (dispensing resumption instruction). The replenishment end instruction may be not only the instruction voluntarily input by a user but also information to be detected by a sensor or the like. The replenishment end instruction and the dispensing resumption instruction may each be provided by operating the input unit 19c (including the switches with indicators 23a, 23b, 23c, 24a, 24b, and 24c).

When first predetermined time has elapsed while a consumable is not replenished after the automatic analyzer 100 has transitioned to the replenishment permission state (step S43; Yes), the device state control unit 119d causes the automatic analyzer 100 to transition to the analysis stop state (step S44), and ends the process. Such a process prevents a situation where the automatic analyzer 100 continuously operates while a consumable is not appropriately replenished, and thus an inappropriate analysis process is performed.

On the other hand, when a consumable is replenished before the first predetermined time has elapsed (step S45; Yes), the device state control unit 119d waits for the dispensing resumption instruction from a user.

When second predetermined time has elapsed while the dispensing resumption instruction is not input after the consumable is replenished (step S46; Yes), the device state control unit 119d causes the automatic analyzer 100 to transition to the analysis stop state (step S44), and ends the process. Such a process prevents a situation where the automatic analyzer 100 continuously operates while a user does not perform an appropriate process, resulting in an inappropriate analysis process.

On the other hand, when the dispensing resumption instruction is input before the second predetermined time has elapsed (step S47; Yes), the device state control unit 119d causes the automatic analyzer 100 to transition from the replenishment permission state to the replenishment prohibition state (step S48). As a result, dispensing is resumed by the specimen dispensing mechanism 10 (step S49).

Figure 5:
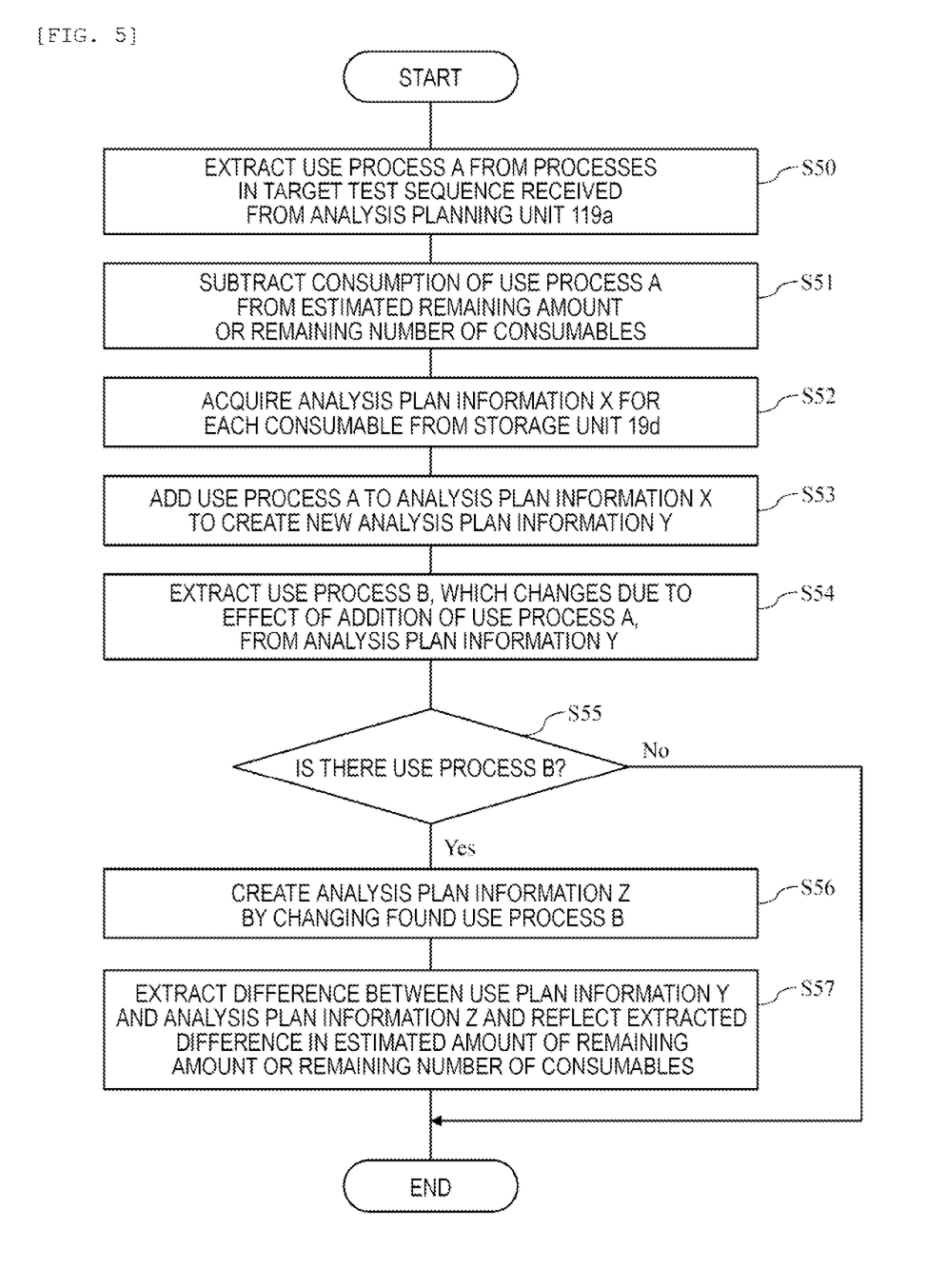
FIG. 5 is a flowchart showing a process of calculating a predicted amount of the remaining amount or the remaining number of consumables under analysis used in the automatic analysis device.

FIG. 5 is a flowchart illustrating a process of calculating a predicted value of the remaining amount or the remaining number of consumables. FIG. 6 is a diagram illustrating a relationship between a use process A and a use process B with a detection step as an example for calculating a predicted value of the remaining amount or the remaining number of consumables. Description is now given with FIGS. 5 and 6 on calculation during analysis of the predicted value of the remaining amount or the remaining number of consumables in the automatic analyzer 100. This process is performed for each test sequence.

As described before, the analysis planning unit 119a acquires analysis plan information from the storage unit 19d during analysis, and checks whether a target test sequence can be scheduled in a current cycle (whether the target test sequence can be registered in the analysis plan information) based on the analysis plan information.

At this time, the analysis planning unit 119a refers to the consumables remaining amount prediction unit 119b for whether the predicted value of the remaining amount or the remaining number of consumables is equal to or less than the specified value. In response to such a reference, the consumables remaining amount prediction unit 119b performs a process illustrated in FIG. 6.

Figure 6:
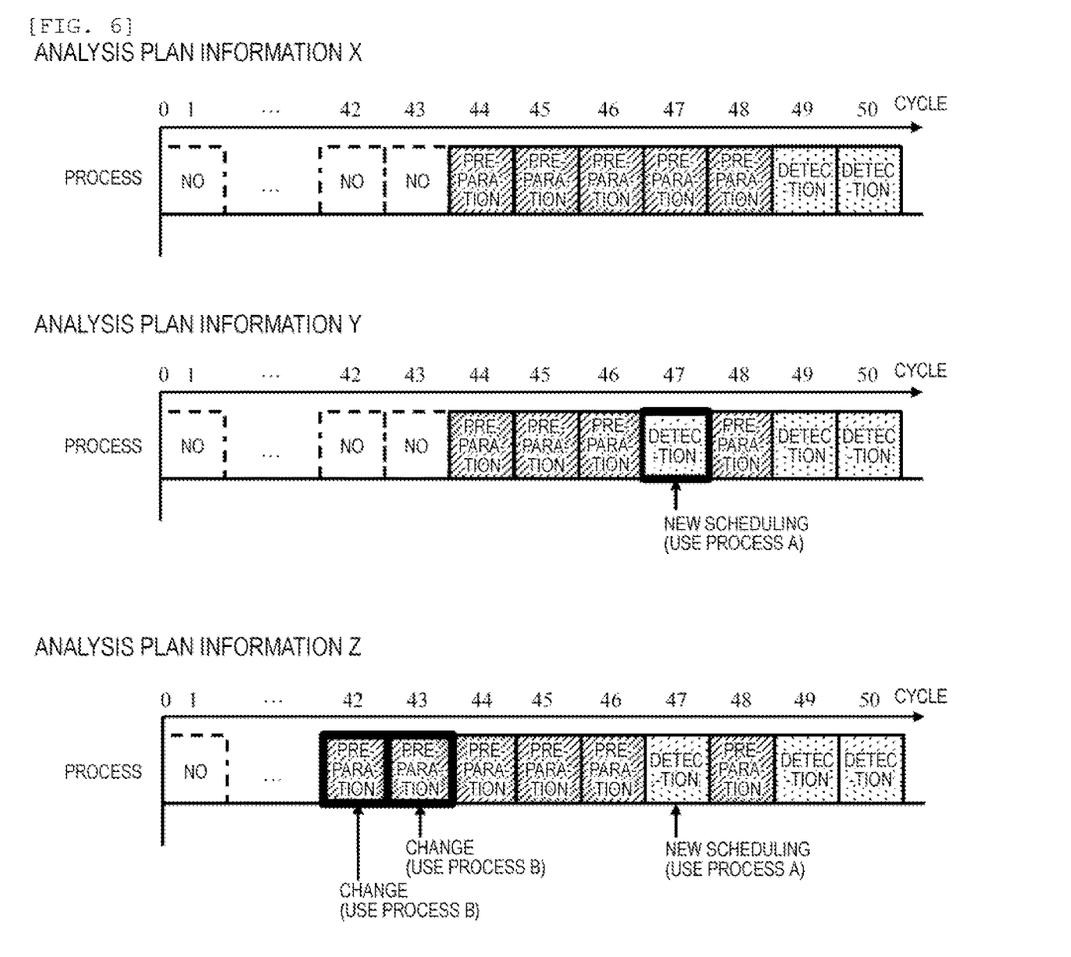
FIG. 6 is a diagram illustrating a relationship between a use process A and a use process B in which a detection process is used as an example for calculating a predicted amount of the remaining amount or the remaining number of consumables used in the automatic analysis device.

In the example of FIG. 6, the consumables remaining amount prediction unit 119b first acquires from the analysis planning unit 119a a target test sequence including a plurality of steps indicating operation of the automatic analyzer 100. The consumables remaining amount prediction unit 119b extracts a step using any of the consumables from the target test sequence (step S50). In this example, a use process A using a specific consumable is assumed to be extracted.

After extracting the use process A, the consumables remaining amount prediction unit 119b reflects the consumption of the consumable in the use process A on the predicted value of the remaining amount or the remaining number of the target consumable (step S51). This process is performed by subtracting the consumption in the use process A from the current remaining amount or remaining number of the consumable, for example. When the use process A includes a plurality of use processes, the total consumption is subtracted.

Information indicating the consumption of the consumable in each process (for example, the use process A) may be beforehand stored in the storage unit 19d for each process type.

As described above, the consumables remaining amount prediction unit 119b predicts the remaining amount or the remaining number of consumables based on a type and the number of a step (in this example, the use process A) using the consumable. This makes it possible to consider the remaining amount or the remaining number of consumables in consideration of not only the remaining amount or the remaining number of existing consumables but also a future consumption schedule.

Subsequently, the consumables remaining amount prediction unit 119b acquires analysis plan information X of each consumable from the storage unit 19d (step S52). Subsequently, the consumables remaining amount prediction unit 119b adds the use process A to a specified cycle (specified by the analysis planning unit 119a) of the analysis plan information X, and thus generates new analysis plan information (step S53). The new analysis plan information is now defined as analysis plan information Y.

The consumables remaining amount prediction unit 119b extracts a step, which is to be influenced by a current scheduling condition, from the analysis plan information Y (step S54). A specific method and the specific process content for specifying a step to be influenced by the current scheduling condition can be appropriately designed by those skilled in the art based on a known technique and the like. A step extracted in the step S54 is now defined as the use process B.

When one or more step (use process B) to be influenced by the scheduling condition is extracted in the step S54 (step S55; Yes), scheduling of the analysis plan information Y is changed for the use process B, and analysis plan information Z is generated (step S56).

A relationship between the use process A and the use process B is now supplementarily explained with FIG. 6. In this example, a step is one of steps, i.e., an empty step (a cycle in which no step is scheduled), a preparation step, and a detection step. The detection step is assumed to correspond to the use process A, and the preparation step is assumed to correspond to the use process B. The detection step is a main step, and the preparation step is a step in which preparation necessary for the detection step is performed. The use process B may use the same consumable as in the use process A.

In the analysis plan information X before scheduling of a new test sequence, a preparation step is scheduled in each of steps from the $44^{th}$ cycle to the $48^{th}$ cycle, and a detection step is scheduled in each of steps of the $49^{th}$ cycle and the $50^{th}$ cycle.

Since the preparation step is merely an auxiliary step for the detection step, a new detection step can be scheduled in a cycle in which the preparation step is scheduled. In the analysis plan information Y in FIG. 6, therefore, a new detection step is scheduled in the $47^{th}$ cycle.

This embodiment is assumed to have the following rule: if a new detection step is scheduled, the previous five cycles must be preparation steps. Whether the analysis plan information Y meets the rule is determined, and the number of the preparation steps is found to be insufficient because the detection step is overwritten in the $47^{th}$ cycle.

Hence, the respective empty steps in the $42^{th}$ cycle and the $43^{th}$ cycle need to be newly scheduled as preparation steps based on the detection step placed in the $47^{th}$ cycle in order to allow the analysis plan information to meet the rule. The consumables remaining amount prediction unit 119*b* thus generates new analysis plan information (the analysis plan information Z in the example of FIG. 6).

As described above, when a scheduling condition of the use process A is changed, a scheduling condition of the use process B may be accordingly changed.

The consumables remaining amount prediction unit 119*b* extracts a difference between the analysis plan information Y and the analysis plan information Z, and reflects the difference on the predicted value of the remaining amount or the remaining number of consumables (step S57).

On the other hand, when there is no step (use process B) influenced by the scheduling condition (step S55; No), the processes of the steps S56 and S57 are not performed.

In this way, the consumables remaining amount prediction unit 119*b* calculates the predicted value of the remaining amount or the remaining number of each consumable. The consumables remaining amount prediction unit 119*b* determines whether the calculated predicted value of the remaining amount or the remaining number of the consumable is equal to or less than the specified value, and notifies the analysis planning unit 119*a* of the determination result.

The analysis planning unit 119*a* determines whether the target test sequence can be finally scheduled in the specified cycle. When the scheduling is determined to be possible, the consumables remaining amount prediction unit 119*b* receives an instruction from the analysis planning unit 119*a*, updates the predicted value of the remaining amount or the remaining number of each consumable, and notifies the storage unit 19*d* of the updated predicted value to store the updated predicted value.

As described above, the consumables remaining amount prediction unit 119*b* acquires analysis plan information indicating a use schedule of a consumable, and updates the analysis plan information based on a type and the number of a step using the consumable. This makes it possible to consider the remaining amount or the remaining number of consumables in consideration of not only the remaining amount or the remaining number of existing consumables but also a future consumption schedule and a step influenced by the future consumption schedule.

Figure 7:
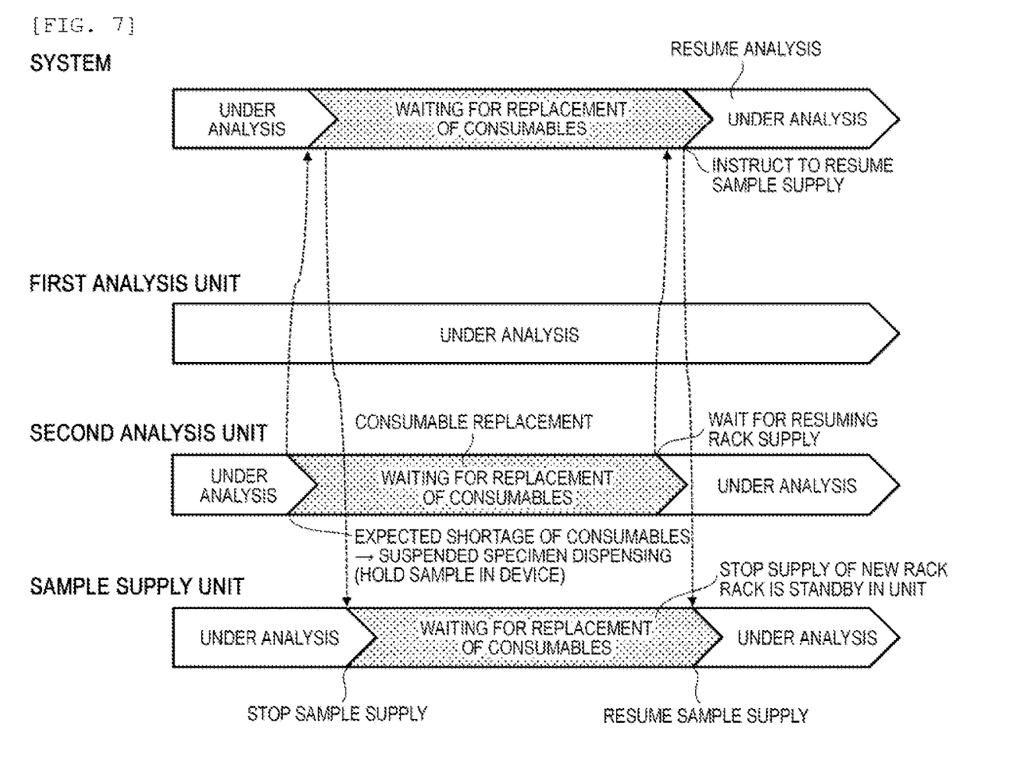
FIG. 7 is a diagram for illustrating a transition of a device state when the remaining amount or the remaining number of consumables used in the automatic analysis device is predicted to be equal to or less than a specified value.

FIG. 7 is a diagram illustrating a transition of a state of the automatic analyzer 100 when the remaining amount or the remaining number of consumables is determined to be equal to or less than a specified value. A system, a first analysis unit, a second analysis unit, and a specimen supply unit are arranged. The first and second analysis units can each be configured by the automatic analyzer 100 of the first embodiment.

The first and second analysis units are each assumed to be in operation in the replenishment prohibition state. Description is now given on operation behavior when the remaining amount of a consumable is determined during analysis to be equal to or less than the specified value in the second analysis unit.

For example, the remaining amount of a system reagent in an external bottle is assumed to be determined to be equal to or less than the specified value in the second analysis unit. At this time, the second analysis unit notifies the system of that effect. In response to this, the system instructs the specimen supply unit to stop specimen supply, and the second analysis unit transitions from the replenishment prohibition state to the replenishment permission state (state of waiting for replenishment of a consumable).

Subsequently, the second analysis unit suspends specimen dispensing. While holding the specimen vessel rack 2, the second analysis unit waits for replenishment of the system reagent in the external bottle while continuing analysis for a test in which specimen dispensing has been completed. The specimen supply unit stops supply of a new specimen vessel rack 2, and waits while holding other specimen vessel racks 2. On the other hand, the first analysis unit is in the replenishment prohibition state all the time and normally continues analysis.

When the system reagent in the external bottle is replenished in the second analysis unit, the second analysis unit notifies the system of that effect, and waits until supply of the specimen vessel rack 2 is resumed. In this state, the system waits for a dispensing resumption instruction from a user. When a user inputs an dispensing resumption instruction via the input unit 19*c*, the system instructs the specimen supply unit to resume supply of the specimen vessel rack 2. In response to this, the specimen supply unit resumes specimen dispensing.

As described above, according to the automatic analyzer 100 of the first embodiment, even if the number of a consumable is equal to or less than a predetermined number, dispensing can be promptly resumed after a user replenishes the consumable, and waste of a specimen can be eliminated.

For example, the specimen dispensing tip 10*a*, the reaction vessel 8, the waste box, and the external reagent vessels 21*a*, 21*b*, and 21*c*, and liquids (including a reagent) accommodated in those can be efficiently replenished.

REFERENCE SIGNS LIST

1: specimen vessel
2: specimen vessel rack
3: rack transport line
4: reagent vessel
5: reagent cool box
6*a*, 6*b*, 6*c*: external reagent holder (consumables holding unit)
7: reagent cool box cover
7*a*: reagent cool box cover opening unit
8: reaction vessel (consumables)
9: incubator
10: specimen dispensing mechanism (specimen dispensing unit)
10*a*: specimen dispensing tip (consumables)
11: reagent dispensing mechanism
12: reaction vessel and specimen dispensing tip storage unit
13: reaction vessel and specimen dispensing tip supply unit (consumables holding unit)
14: reaction vessel agitation mechanism
15: disposal hole
16: transport mechanism
16*a*: tip mounting position
17*a*, 17*b*: nozzle
18*a*, 18*b*: detection unit (analysis unit)
19: control device
19*a*: control unit
19*b*: display unit
19*c*: input unit (instruction receiving unit)
19*d*: storage unit
21*a*, 21*b*, 21*c*: external reagent vessel (consumables)
23*a*, 23*b*, 23*c*, 24*a*, 24*b*, 24*c*: switch with indicator (instruction receiving unit)
26: front surface cover
100: automatic analysis device
119*a*: analysis planning unit
119*b*: consumables remaining amount prediction unit
119*c*: consumables remaining amount detection unit 119d: device state control unit All references, including publications, patents, and patent applications, cited herein are incorporated herein by reference.

The invention claimed is:

1. An automatic analysis device comprising:
    a specimen dispensing unit for dispensing a specimen;
    an analysis unit for analyzing components included in the specimen;
    a consumables holding unit for holding a consumable used for the analysis of the specimen;
    a consumables remaining amount prediction unit for predicting the remaining amount or the remaining number of consumables held in the consumables holding unit; and
    a device state control unit for controlling the state of the automatic analysis device, wherein
    the state of the automatic analysis device includes a replenishment prohibition state in which replenishment of the consumables is prohibited, and a replenishment permission state in which replenishment of the consumables is permitted,
    in the replenishment prohibition state, the specimen dispensing unit performs dispensing, and the analysis unit performs analysis,
    in the replenishment permission state, the specimen dispensing unit does not perform dispensing, and the analysis unit performs analysis, and
    in response to determining that the remaining amount or the remaining number of consumables predicted by the consumables remaining amount prediction unit is equal to or less than a predetermined value, the device state control unit causes the automatic analysis device to transition to the replenishment permission state.

2. The automatic analysis device according to claim 1, further comprising:
    an instruction receiving unit for receiving an instruction from a user, wherein
    after the consumables are replenished, the device state control unit causes the automatic analysis device to transition to the replenishment prohibition state in response to a dispensing resume instruction from a user.

3. The automatic analysis device according to claim 2, wherein
    the state of the automatic analysis device further includes an analysis stop state,
    in the analysis stop state, the analysis unit does not perform analysis,
    in response to determining that a first predetermined time has elapsed without replenishment of consumables after the transition of the automatic analysis device to the replenishment permission state, the device state control unit causes the automatic analysis device to transition to the analysis stop state, and
    in response to determining that a second predetermined time has elapsed without inputting the dispensing resume instruction after the replenishment of consumables, the device state control unit causes the automatic analysis device to transition to the analysis stop state.

4. The automatic analysis device according to claim 1, wherein
    the consumables remaining amount prediction unit acquires a test sequence including a plurality of processes representing the operation of the automatic analysis device,
    extracts the process using consumables from the test sequence, and
    predicts the remaining amount or the remaining number of consumables based on the type and number of the processes using the consumables.

5. The automatic analysis device according to claim 1, wherein
    the consumable is a reaction vessel or a specimen dispensing tip.

6. The automatic analysis device according to claim 1, wherein
    the consumable is a reagent vessel.

7. The automatic analysis device according to claim 4, wherein
    the consumables remaining amount prediction unit
        acquires analysis plan information indicating the use schedule of consumables, and
        updates the analysis plan information based on the type and number of the processes using the consumables.

* * * * *